United States Patent
Hidaka et al.

(10) Patent No.: US 9,616,393 B2
(45) Date of Patent: Apr. 11, 2017

(54) POROUS HOLLOW FIBER MEMBRANE FOR TREATING BLOOD

(75) Inventors: Hidetoshi Hidaka, Tokyo (JP); Takahiro Ichi, Tokyo (JP)

(73) Assignee: ASAHI KASEI MEDICAL CO., LTD., Tokyo (JP)

( * ) Notice: Subject to any disclaimer, the term of this patent is extended or adjusted under 35 U.S.C. 154(b) by 368 days.

(21) Appl. No.: 12/746,075

(22) PCT Filed: Dec. 4, 2008

(86) PCT No.: PCT/JP2008/072027
§ 371 (c)(1),
(2), (4) Date: Jun. 3, 2010

(87) PCT Pub. No.: WO2009/072548
PCT Pub. Date: Jun. 11, 2009

(65) Prior Publication Data
US 2010/0258496 A1    Oct. 14, 2010

(30) Foreign Application Priority Data
Dec. 6, 2007 (JP) .................................. 2007-316214

(51) Int. Cl.
*B01D 69/08* (2006.01)
*B01D 71/68* (2006.01)
*B01D 69/02* (2006.01)

(52) U.S. Cl.
CPC .......... *B01D 71/68* (2013.01); *B01D 69/087* (2013.01); *B01D 69/02* (2013.01); *B01D 2325/02* (2013.01); *B01D 2325/04* (2013.01)

(58) Field of Classification Search
CPC .......... B01D 2325/02; B01D 2325/021; B01D 2325/022; B01D 2325/025; B01D 71/68; B01D 69/08; B01D 69/087; B01D 2323/12

(Continued)

(56) References Cited

U.S. PATENT DOCUMENTS 5,340,480 A * 8/1994 Kawata et al. .......... 210/500.23
5,747,680 A * 5/1998 McArthur .................. 73/112.01
(Continued)

FOREIGN PATENT DOCUMENTS

CN    1684727       10/2005
EP    1 547 628 A1  6/2005
(Continued)

OTHER PUBLICATIONS

International Search Report for PCT/JP2008/072027, mailed Jan. 27, 2009.
(Continued)

*Primary Examiner* — David C Mellon
*Assistant Examiner* — Pranav Patel
(74) *Attorney, Agent, or Firm* — Greenblum & Bernstein, P.L.C.

(57) ABSTRACT

It is intended to provide a porous hollow fiber membrane for treating blood which suffers from little mechanical damage in the course of production, transfer or handling and shows excellent fractionation properties though it is a thinned polysulfone-based hollow fiber membrane. A porous hollow fiber membrane for treating blood which comprises a polysulfone-based polymer and polyvinylpyrrolidone and has a gradient porous structure with an increase in pore size from the inside to the outside along the membrane thickness direction, characterized in that the porous structure has a membrane thickness of 25 μm or more but less than 40 μm, and fibrils having an average diameter of from 100 to 200 μm are provided in such a manner that the ratio (To/Ti) of the average outside diameter (To) along the membrane thickness direction to the average inside diameter (Ti) is adjusted to not more than 2.

19 Claims, 2 Drawing Sheets

(58) Field of Classification Search
USPC .............. 210/321.87, 500.1, 500.21, 500.22, 210/500.23, 500.27, 502.1, 503, 505, 506, 210/508
See application file for complete search history.

(56) References Cited

U.S. PATENT DOCUMENTS

| | | | | |
|---|---|---|---|---|
| 6,802,971 | B2* | 10/2004 | Gorsuch | B01D 67/0011 210/500.23 |
| 2003/0232184 | A1* | 12/2003 | Morikawa et al. | 428/316.6 |
| 2005/0242021 | A1* | 11/2005 | Ditter et al. | 210/500.23 |
| 2006/0108288 | A1* | 5/2006 | Oishi | 210/639 |
| 2006/0191844 | A1* | 8/2006 | Mahuchi et al. | 210/500.23 |
| 2007/0007193 | A1 | 1/2007 | Uchi et al. | |
| 2008/0142434 | A1 | 6/2008 | Mabuchi et al. | |
| 2008/0237127 | A1 | 10/2008 | Okafuji et al. | |
| 2010/0087771 | A1 | 4/2010 | Karakama et al. | |
| 2010/0133170 | A1 | 6/2010 | Satoh et al. | |

FOREIGN PATENT DOCUMENTS

| | | |
|---|---|---|
| EP | 1685862 | 8/2006 |
| EP | 1 834 655 A1 | 9/2007 |
| EP | 2151273 | 2/2010 |
| JP | 04-300636 | 10/1992 |
| JP | 05-54373 | 3/1993 |
| JP | 06-165926 | 6/1994 |
| JP | 09-154936 | 6/1997 |
| JP | 10-109023 | 4/1998 |
| JP | 10-118472 | 5/1998 |
| JP | 10-216488 | 8/1998 |
| JP | 10-243999 | 9/1998 |
| JP | 11-332980 | 12/1999 |
| JP | 2000-334281 | 12/2000 |
| JP | 2001-38171 | 2/2001 |
| JP | 2003-033432 | 2/2003 |
| JP | 2003-154240 | 5/2003 |
| JP | 2003-245524 | 9/2003 |
| JP | 2004-075741 | 3/2004 |
| JP | 2005-058906 | 3/2005 |
| JP | 2005-087350 | 4/2005 |
| JP | 2005-342139 | 12/2005 |
| WO | 98/52683 | 11/1998 |
| WO | 2005/046763 | 5/2005 |

OTHER PUBLICATIONS

International Preliminary Report on Patentability for PCT/JP2008/072027, mailed Aug. 19, 2010.
China Office action, mail date is Dec. 16, 2011.
Supplementary European Search Report issued with respect to European Patent App. No. 08858348.9, dated Apr. 29, 2011.
Korean language Office Action from corresponding Korean application, and Japanese language translation thereof.
Japanese Office Action issued with respect to corresponding Japanese Application No. 2009-544703, dated Jun. 21, 2012.
E.P.O. Opposition, mail date is Jul. 18, 2013 and English langauge translation thereof.

* cited by examiner

POROUS HOLLOW FIBER MEMBRANE FOR TREATING BLOOD

TECHNICAL FIELD

The present invention relates to a porous hollow fiber membrane for treating blood. The invention relates in particular to a porous hollow fiber membrane for treating blood which is low in risk that the membrane is mechanically damaged when the membrane is used in dialysis treatment and is excellent in fractionation property.

BACKGROUND ART

Blood purification therapy of an extracorporeal circulation type has been widely used as a treatment method for improving a symptom by removing, from blood, etiologic materials and toxic waste products accumulated in the blood due to various causes. Blood treating membranes are each a separating membrane loaded in a blood treating device such as a blood dialyzer, a blood filtrating device, a blood component fractionator, or a plasma separator that is used in the extracorporeal circulation type blood purification therapy. At present, most of the membranes are blood treating membranes of a hollow fiber membrane type.

The membrane structure of blood treating membranes is roughly classified into a homogeneous membrane, which has no skin layer in any transverse section of the membrane and is dense as a whole, and an inhomogeneous membrane, which is composed of a skin layer (dense layer) as a separation function region and a supporting layer as a reinforcing region. Furthermore, the inhomogeneous membrane is roughly classified into a symmetric membrane and an asymmetric membrane. Such a membrane structure is appropriately designed in accordance with a specific usage of the membrane. In the case of a blood dialyzer, which is a typical example of blood treating devices from the viewpoint of the percentage in the quantity thereof or product-varieties thereof, great importance is placed on the balance between diffusing performance and filtrating performance in order to improve the performance of the dialyzer. As a means for embodying very high diffusing performance and filtrating performance, an asymmetric porous structure is often adopted as the membrane structure thereof.

As the material of blood treating membranes, a membrane material made mainly of a polymer has been used, examples of the polymer including cellulose-, cellulose acetate-, polyamide-, polyolefine-, polyacrylonitrile- and polysulfone-based polymers. In particular, polysulfone-based polymer is excellent in film-forming performance as well as biological safety or chemical stability. The polymer can be designed to have various permeabilities or membrane structures. In recent years, therefore, the polymer has been rapidly spreading as a membrane material of blood treating membranes.

Such a membrane structure and membrane material have been combined to make investigations into various porous hollow fiber membranes for treating blood in which polysulfone-based polymer is used. As described above, in particular, as to a blood dialyzer, for reasons related to the size of materials to be separated, it is necessary not only to pay attention to the filtrating performance as in other blood treating devices, but also to keep a delicate balance between the diffusing performance and the filtrating performance. For the purpose, the shape of its vessel is an important factor; however, a basic factor therefor is the fractionation property inherent in the membrane thereof.

In general, the fractionation property of a membrane is an index for the degree of sorting into components to be caused to permeate through the membrane and components to be inhibited from permeating therethrough, and which is obtained as the comprehensive results of all separation principles including diffusion, filtration, adsorption and the like.

In the case of a hollow fiber membrane for blood dialysis, the fractionation property is an index for the degree to which low molecular weight proteins, such as $\beta_2$-micro globulin which is a uremic toxins and is one of targets to be removed by dialysis treatment, are caused to permeate and remove at a high ratio while an albumin, which is a useful protein having a small difference in molecular weight from the above-mentioned proteins and should be kept in dialysis treatment, is restrained from permeating through the membrane. The height of the fractionation property, which may be referred to as the sharpness thereof, is an important performance required for blood treating membranes. Known are a large number of polysulfone-based porous hollow fiber membranes in which the fractionation property is improved from the viewpoint of the membrane structure, the production process and other various points (for example, Patent Documents 1 and 2). However, none of the membranes has as sharp a fractionation property as a living kidney. Thus, a further technical improvement has been desired.

In the meantime, porous hollow fiber membranes for treating blood are generally smaller in inside and outside diameters and membrane thickness than industrial hollow fiber membranes, and thus mechanical properties thereof are never high. As a result, even if a blood-treating porous hollow fiber membrane is sufficient for ordinary blood treatment, the membrane may be mechanically damaged by some factors. Usually, a careful attention is paid to the handling thereof; however, for example, when hollow fiber membranes are inserted, as a bundle, into a cylindrical vessel to fabricate a blood treating device, the hollow fiber membranes in the outer circumferential region of the bundle may be rubbed with the inner wall of the vessel to be bent. This causes a poor external appearance in the quality, or a poor flow of blood. It is therefore unavoidable to exclude the poor products from the producing process. Moreover, the effect of water introduced into a blood treating device is large; thus, in a wet type blood treating device, its hollow fiber membranes may be mechanically damaged by a high water flow rate, a high water pressure, the sloshing of water and the like during water filling step or during transferring after the water filling step. In a washing operation carried out in a therapy facility before the device is used, or in a washing step when the device is reused, the hollow fiber membranes may be affected by a high water flow rate or a high water pressure whether the device is of a wet type or of a dry type. The hollow fiber membranes may be cut away at worst by the high water flow rate or high water pressure, or the sloshing of water. In such a case, it is indispensable to remove the membranes in the production process, and to stop the use of the device so as to exchange the membranes in the therapy facility. Furthermore, when the device is used for treatment in the state that a trouble of the membranes is not detected in advance, blood may unfavorably leak to a greater or lesser extent.

The cause of mechanical damages of a hollow fiber membrane is firstly the fact that the diameter and the membrane thickness are very small. Physical properties inherent in a polymer of the membrane material or physical properties inherent in the hollow fiber membrane obtained therefrom are also largely concerned therein. It has been considered that, for example, an effect of the breaking strength or the breaking elongation of the hollow fiber membrane, as a mechanical property inherent in the membrane, is particularly large. In this manner, there is no escape from physical necessity that porous hollow fiber membranes for treating blood are mechanically damaged with ease while the membrane thickness is required to be made as small as possible from the viewpoint of designing a blood treating device into a compact form by making the permeability higher or making the bundle diameter small. Accordingly, an improvement in mechanical properties of hollow fiber membranes also continues to be a technically important theme.

Thus, attention is paid to recent techniques about mechanical properties, such as the strength, the elongation or the like, of high-performance hollow fiber membranes for purifying blood, in particular a polysulfone-based hollow fiber membrane. For example, Patent Document 3 describes that the strength of a membrane is improved by laying a supporting layer continuous with a dense layer, and Patent Document 4 states that an inclined structure of an asymmetric membrane is important for a sharp fractionation property. However, these descriptions are mere descriptions on a basic structure or a characteristic of an asymmetric membrane, which has been already generalized. Patent Document 5 states that a hollow fiber membrane having an asymmetric inclined structure and having a membrane thickness of 35 to 55 μm exhibits a high strength and a high elongation. However, this hollow fiber membrane is a membrane obtained by spinning an unstable membrane-forming raw spinning solution to which water has been added under a special condition of low-temperature coagulation, and is unclear about the degree of the fractionation property thereof and a specific membrane structure thereof.

Regarding these techniques, there are some techniques describing in more detail a relationship between the strength or the elongation of a hollow fiber membrane and the membrane structure. First, from a relatively macroscopic viewpoint, Patent Document 6 describes a network structure of a hollow fiber membrane-thickness section, which structure is made of a polysulfone with a covering layer made of polyvinylpyrrolidone (hydrophilizing agent). Patent Document 7 describes a relationship between a microscopic structure change due to a barus effect caused just below a spinning-out section and the elongation or fractionation property. Though these hollow fiber membranes are excellent in strength and elongation, any of the documents merely shows an example wherein the membrane thickness is 45 μm; it seems to be unavoidable that when the membrane is made thinner, mechanical properties thereof are lowered.

In contrast, Patent Documents 8 and 9 describe the so-called thinned polysulfone-based hollow fiber membrane which has a membrane thickness of 35 μm. However, any of these membranes are a homogeneous structure membrane in consideration of a relationship between the porosity of the membrane and the strength thereof, and those are not such a membrane structure as an asymmetric membrane structure which is carefully considered its diffusing performance.

In the meantime, from a viewpoint at a more microscopic molecular level, Patent Document 10 states that the bonding between polymers themselves is strengthened by optimizing the tension for spinning, so that a membrane having higher mechanical properties is obtained even when the membrane has the same porosity. Patent Document 11 states that when polyvinylpyrrolidone enters among polysulfone particles, the strength of the membrane is lowered. Although these hollow fiber membranes are excellent in strength and elongation, any of the documents merely shows an example of the membrane having a thickness of 45 μm, it seems to be unavoidable that when the membrane is thinned, mechanical properties thereof are lowered. About the relationship with the membrane structure, only an assumed mechanism is suggested. Details thereof are unclear. In contrast, Patent Documents 12 and 13 describe the so-called thinned polysulfone-based hollow fiber membrane which has a membrane thickness of 35 μm. However, the membrane described in Patent Document 12 is a homogeneous structure membrane although Patent Document 12 states that by sealing polyvinylpyrrolidone into a dense structure, the membrane is kept the elongation before and after the chemical treatment. Patent Document 13 states that the membrane density, more specifically the ratio of thickness between a dense layer and a coarse layer and others are concerned in the strength or the elongation of the membrane, and further states that when the content of polyvinylpyrrolidone is high, the skeleton of the membrane is softened, and it is advantageous for achieving the elongation. However, the resultant elongation is at most 46.3%. Thus, it cannot be said that a sufficiently high elongation is obtained. As described above, polyvinylpyrrolidone, which is a hydrophilizing agent, largely affects on the strength and the elongation of the polysulfone-based hollow fiber membrane, thus, the pyrrolidone is not necessarily preferred from the viewpoint of mechanical properties of the membrane. However, when polysulfone with high hydrophobicity is made suitable for blood treatment, it is very convenient to use polyvinylpyrrolidone as a hydrophilizing agent for various reasons. This makes it further difficult to make polysulfone-based hollow fiber membranes thinner.

As described above, the relationship between mechanical properties of a polysulfone-based hollow fiber membrane having an excellent fractionation property and the specific membrane structure thereof, has been mainly investigated in terms of the porosity, the density and homogeneity in structure. However, none of the obtained hollow fiber membranes could be satisfactory. As the membrane structure, for example, a fibril structure can be given from a viewpoint other than the above-mentioned viewpoints. Known are a technique referred to a relationship between a fibril structure of a membrane surface and the fractionation property thereof (Patent Document 14), and a technique referred to a relationship between a fibril structure of a membrane surface and the blood compatibility thereof (Patent Document 15). Also known is a technique referred to the homogeneity of a fibril structure in a thickness section of a membrane (Patent Document 16). However, nothing is known about an effect given to mechanical properties by such a microscopic structure. Accordingly, it has been expected as one direction to achieve further improvements by finding out newly relationships to which attention has not been paid hitherto between/among a membrane structure factor, mechanical properties, fractionation property and the like.

Patent Document 1: JP-A-H04-300636
Patent Document 2: JP-A-H10-243999
Patent Document 3: JP-B-H05-54373
Patent Document 4: JP-A-2003-33432
Patent Document 5: JP-A-2000-334281
Patent Document 6: JP-A-2005-58906
Patent Document 7: JP-A-2003-245524
Patent Document 8: JP-A-H10-109023
Patent Document 9: JP-A-H09-154936
Patent Document 10: WO 98/52683
Patent Document 11: JP-A-2003-154240
Patent Document 12: JP-A-H10-216488
Patent Document 13: JP-A-2005-342139

Patent Document 14: WO 2005/46763
Patent Document 15: JP-A-2005-87350
Patent Document 16: JP-A-H10-118472

DISCLOSURE OF THE INVENTION

Problems to be Solved by the Invention

An object of the invention is to provide a porous hollow fiber membrane for treating blood, which is high in mechanical properties, is not mechanically damaged with ease during the producing process or transportation thereof, or at the time of handling in a therapy facility, and is further excellent in fractionation property even when the membrane is a thinned polysulfone-based hollow fiber membrane.

Means for Solving the Problems

In order to solve the Problems, the inventors have made eager investigations and found out that a skeleton called "fibrils" present as a network in most of a thickness section of a membrane plays an important role in relationship thereof with mechanical properties of the membrane, in particular, with the elongation. The inventors have found out that the problems can be solved by specifying membrane structure factors in a micrometer scale that have not been known hitherto, that is, the thickness of the fibrils and the distribution thereof, so that the findings have led to the completion of the invention. Specifically, the invention is as follows:

(1) A porous hollow fiber membrane for treating blood, comprising a polysulfone-based polymer and polyvinylpyrrolidone, and having a gradient porous structure, in which the pore size increases from the inside of the membrane toward the outside thereof in the membrane thickness direction, wherein the porous structure has a membrane thickness of 25 μm or more and less than 40 μm, and fibrils having a total-average thickness of 100 to 200 nm are arranged so as to set the ratio (To/Ti) of the average outside thickness (To) of the fibrils to the average inside thickness (Ti) thereof in the membrane thickness direction to not less than 1 and not more than 2.

(2) The porous hollow fiber membrane for treating blood according to item (1), wherein the total-average area density (ADav) of the fibrils is from 2 to 60 per square micrometer.

(3) The porous hollow fiber membrane for treating blood according to item (1) or (2), further having a water permeability of 5 to 450 mL/m$^2$/hr/mmHg.

(4) The porous hollow fiber membrane for treating blood according to any one of items (1) to (3), wherein the polysulfone-based polymer is a bisphenol type polysulfone.

(5) A blood treating device, obtained by filling the porous hollow fiber membrane as recited in any one of items (1) to (4) into a cylindrical vessel, embedding both ends thereof with a resin, working the ends to open hollow-fiber-membrane-ends, and then setting a header cap having a liquid-introducing or liquid-discharging nozzle at the both ends, respectively.

EFFECTS OF THE INVENTION

According to the present invention, a porous hollow fiber membrane for treating blood can be provided, which is high in mechanical properties, is not mechanically damaged with ease during the producing process or transportation thereof, or at the time of handling in a therapy facility, and is further excellent in fractionation property even when the membrane is a thinned polysulfone-based hollow fiber membrane. In particular, the porous hollow fiber membrane for treating blood of the invention has a sufficiently high elongation even if the membrane is thinner than that in the prior art, so that the membrane exerts effect of inhibiting the occurrence of the leakage due to the sloshing, for example. Such a novel guiding principle for designing the structure of a membrane additionally contributes largely to developments of porous hollow fiber membranes for treating blood in the future.

DESCRIPTION OF REFERENCE NUMERALS

Figure 1A:
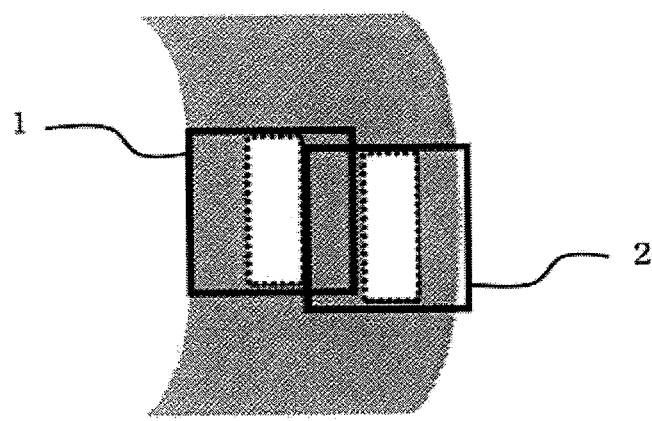
FIG. 1a is a schematic diagram illustrating measurement locations of a cut transverse section of a hollow fiber membrane having a membrane thickness of 30 μm or less in the invention. In the figure, bold-frame-surrounded regions each show a region to be photographed, and white regions each show a region-band to be measured. Individual shots are illustrated by means of deviating them from each other in a vertical direction conveniently for description.

1 First shot
2 Second shot
3 Third shot
4 Fibrils
5 Joint region
6 Pore
7 Fibril thickness

BEST MODE FOR CARRYING OUT THE INVENTION

Hereinafter, the porous hollow fiber membrane for treating blood of the invention will be described.

The porous hollow fiber membrane for treating blood of the invention is a blood treating membrane filled like a bundle in a blood treating device used for blood purification therapy of an extracorporeal circulation type. The blood treating device is in particular preferably, for example, a blood dialyzer, a blood filtrating device, a blood filtrating and dialyzing device, or a sustainable article thereof, specifically, a sustainable blood dialyzer, a sustainable blood filtrating device or a sustainable blood filtrating and dialyzing device. Depending on each application, the detailed specification of the blood treating membrane, such as the dimension, the fractionation property thereof or the like, may be determined.

It is necessary that the membrane comprises a hydrophobic polysulfone-based polymer as a main membrane material, and polyvinylpyrrolidone, which is most widely used as a hydrophilizing agent for blood purifying membranes. In this manner, the fractionation property is delicately controlled in accordance with the usage, and this material is made into a porous hollow fiber membrane having a microscopic membrane structure which will be described later. Additionally, the blood compatibility is also easily optimized.

As long as the material basically has this composition, the material may also contain a second hydrophilizing agent such as glycerin, polyethylene glycol or the like, other additives, a surface modifier or the like.

The polysulfone-based polymer (hereinafter referred to as PSf) is a generic name of bisphenol type polysulfones (hereinafter referred to as Bis-PSf), which is a polymer having repeating units each represented by the following formula (1), or polyethersulfones (hereinafter referred to as PES), which is a polymer having repeating units each represented by the following formula (2), and is widely used as a raw material of a hollow fiber membrane:

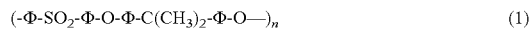
(1)

(2)

wherein Φ represents a benzene ring, and n represents repeating unit number in the polymer. The Bis-PSf of the formula (1) is commercially available, for example, under the name of "UDEL (registered trademark)" from Solvay or under the name of "Ultrason (registered trademark)" from BASF, and the PES of the formula (2) is commercially available under the name of "SUMIKA EXCEL (registered trademark)" from Sumitomo Chemical Co., Ltd. In accordance with the polymerization degree thereof or the like, some kinds of polymers are available, thus, it may be used these polymers appropriately.

Polyvinylpyrrolidone (hereinafter referred to as PVP) is a water-soluble polymeric compound obtained by vinyl-polymerizing N-vinylpyrrolidone, and is widely used as a hydrophilizing agent or a pore forming agent for the raw material of a hollow fiber membrane. PVP are commercially available under the name of "PLASDONE (registered trademark)" from ISP or under the name of "LUVITEC (registered trademark)" from BASF, and in both case, some polymers having deferent molecular weights are available, thus, it may be used these polymers appropriately.

The structure of the membrane is a porous body. When membrane-thickness section is observed under a scanning electron microscope at a magnification of about 1000 times, the following structure is recognized: a network made of the polymer and a large number of fine pores, which are regions other than the network, are present substantially over the whole. The membrane is different from the so-called homogeneous membrane, which has no observable fine pores according to such a magnification and appears to be substantially uniform. More specifically, the membrane structure is a gradient porous structure wherein in a transverse section perpendicular to the longitudinal direction, that is, in a membrane-thickness section, the pore size of pores increases gradually from the inside, which is the hollow side, toward the outside. In such a membrane structure, the inside is a relatively dense layer and the innermost side is a layer which dominates the fractionation property. On the other hand, the relatively coarse layer exclusively constitutes a supporting layer; however, the gradient structure, where the pore size of the pores increases gradually, makes the mass transfer smoother in dialysis or filtration, and at the same time contributes to an improvement in the mechanical properties. If microvoids having a diameter of about 10 μm to several tens micrometers are present, the continuity of the variation of pore size is damaged. Thus, it is preferred that no microvoids be contained.

The porous hollow fiber membrane for treating blood of the invention should have a membrane thickness of not less than 25 μm and less than 40 μm. Such a membrane thickness is already known in the case of blood treating membranes using PSf. However, the membrane thickness which is put into practical use is about 40 to 55 μm in the case of bisphenol type polysulfone (Bis-PSf). A membrane thickness has to be made smaller than this thickness in order to obtain an advantage by thinning the membrane. About PES, the membrane having even a thickness of about 35 μm is put into practical use. However, the hollow fiber membrane of this polymer has a disadvantage of being low in mechanical properties, in particular, strength and elongation. According to the findings of the inventors, an actually measured elongation thereof is only in the order of 30%. If the membrane thickness is made as small as less than 25 μm in a porous hollow fiber membrane using PSf, it is difficult to obtain predetermined mechanical properties even when a microscopic structure of the membrane, which will be described later, is controlled. Thus, the handleability goes extremely down in the producing process. Additionally, a risk that the membrane may be mechanically damaged by water flow or the like is also unfavorably raised. The membrane thickness is more preferably less than 30 μm, in particular preferably less than 35 μm in order that the membrane may gain predetermined mechanical properties while importance is placed on fractionation property as the performance of blood dialysis membranes.

The porous hollow fiber membrane for treating blood of the invention is characterized in that in the above-mentioned gradient porous structure, the membrane has a skeleton-like structural region called "fibrils" present in a network form in most of its membrane-thickness section, as well as being a thin membrane. In the skeleton-like, microscopic structural region, the thickness (T) of the fibrils is particularly important. The membrane is characterized by the following two points: the "total-average thickness (Tav)", which is the average value over the whole of the membrane-thickness section; and "the ratio (To/Ti) of the average outside thickness (To) to the average inside thickness (Ti) in the membrane-thickness section".

Figure 1B:
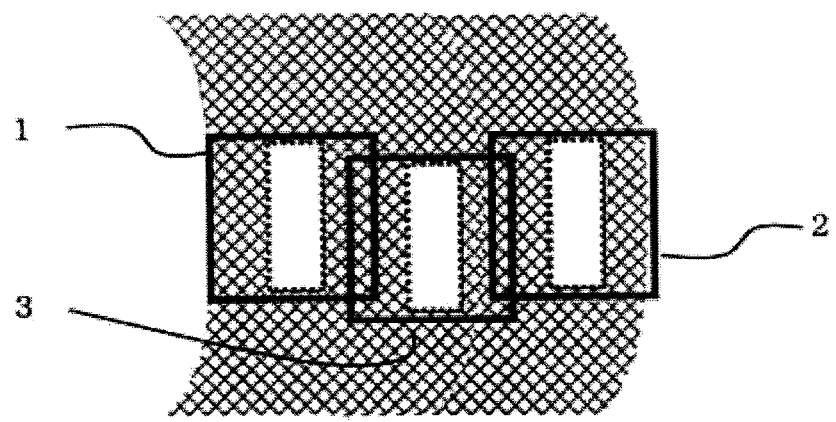
FIG. 1b is a schematic diagram illustrating measurement locations of a cut transverse section of a hollow fiber membrane having a membrane thickness of more than 30 μm in the invention.
Figure 2:
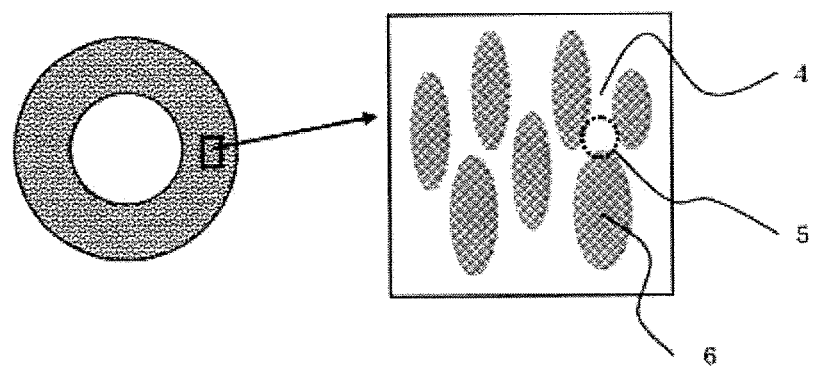
FIG. 2 is a schematic diagram illustrating fibrils in a porous structure in the invention.

The thickness of the fibrils is first described while a measuring method thereof is shown. A target hollow fiber membrane is made wet with water, and then cut substantially perpendicularly to the longitudinal direction in the state that the membrane is frozen at −30° C., thereby obtaining a transverse-section-cut sample. A scanning electron microscope (high resolving power SEM-S4700 manufactured by Hitachi Ltd. in the invention) is used to observe the resultant transverse-section-cut sample at a photographing acceleration voltage of 10 kV with a photographing magnification of 10000 times. Under the conditions, the structure corresponding to a 15-μm width of the membrane-thickness section can be observed. First, in a hollow fiber membrane having a membrane thickness of 30 μm or less, the innermost side (hollow side) of the membrane-thickness section is matched with an end of the visual field, and a first shot is taken. Next, the outermost side is matched with the end of the visual field and a second shot is taken (see FIG. 1(a)). In a hollow fiber membrane having a membrane thickness of more than 30 μm, the central point in the membrane thickness is determined. Thereafter, the center of the visual field is matched with the central point, and further a third shot is taken (see FIG. 1(b)). In the thus-obtained individual structural photographs of the transverse section, a porous structure in which the polymer constituting the membrane is developed into a network form to make a large number of pores is photographed. As if Polymeric walls partitioning the individual pores are observed in the form of fibers; thus, this structural region is called fibrils in the invention (see FIG. 2). As illustrated in FIG. 2, each fibrils cause the membrane-thickness section to be three-dimensionally developed, while joint region jointed between the fibrils themselves is formed by a portion surrounded by three or more pores. Accordingly, the fibrils referred to in the invention are different from fibrils formed in the longitudinal direction by high stretching in melt spinning (the fibrils may be also referred to as lamella structures), and are also different from fibrils formed in the longitudinal direction on the inner surface of a hollow fiber membrane in wet spinning.

Figure 3:
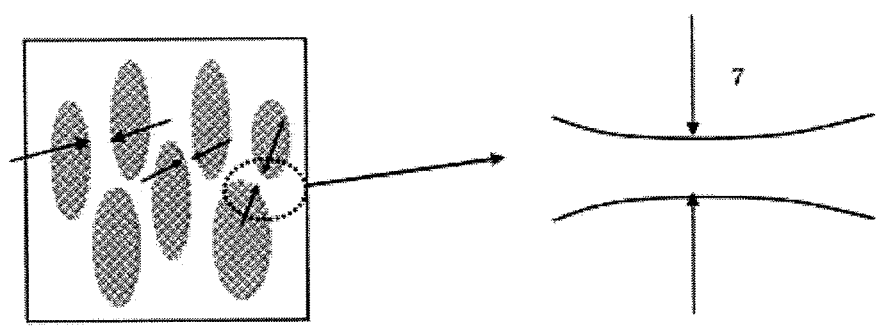
FIG. 3 is a schematic diagram illustrating a measurement location of the fibril thickness in the invention.

The thickness (T) of fibril in the invention is defined as a value obtained by reading the thickness of the vicinity of the center of each fibril observed in the above-mentioned photographs, that is, the thickness of the portion having the smallest width in the distance between joint regions jointed between the fibrils themselves, from an angle of 90 degrees to the longitudinal direction of the fibril (see FIG. 3). The thickness of the fibril may be read from the printed photographs by hand using a scale, or may also be read on a computer screen by means of an image processing software. A region where the thicknesses of fibrils are measured is a region-band corresponding a width of 5-μm in the central region in the membrane thickness direction in each membrane structure photographs, which are obtained by taking the shots of the 15-μm width corresponding regions. One hundred fibrils are arbitrarily selected from the fibrils present in the region-band, and the thicknesses thereof are measured. This operation is made about each of the structure photographs. The average of the thicknesses of all the measured fibrils is defined as the "total average thickness (Tav)". The average of the thicknesses of the fibrils inside the viewed field of the outermost layer in the membrane-thickness section is defined as the "average inside thickness Ti". The average of the thicknesses of the fibrils inside the viewed field of the innermost layer therein is defined as the "average outside thickness To". The "ratio between the fibril thicknesses (To/Ti)" is then calculated, and this is used as an index showing the distribution of the fibril thicknesses in the membrane thickness direction.

In a hollow fiber membrane having a gradient structure as in the invention, a dense layer generally having a thickness of 2 to 3 μm is often formed in the innermost of the membrane-thickness section. Usually, such a dense layer has polymer particles gathered densely, and has a membrane structure in which fibrils defined in the invention are not observed. In this case also, however, a line 5 μm apart from the innermost in the membrane thickness direction is rendered a starting point, thereby excluding the region where the particles gather densely from the region where the thicknesses of fibrils are to be measured.

The inventors have made detailed investigations on the thicknesses of fibrils in the porous structure, to which attention has not been paid at all hitherto. As the result, the inventors have found out for the first time that mechanical properties of a hollow fiber membrane, in particular, the elongation and the fractionation property, can be controlled by controlling its microscopic membrane structure in such a manner that the total average thickness (Tav) is set into a specific range and further the fibrils are arranged in its membrane-thickness section so that the ratio (To/Ti) of the average outside thickness (To) to the average inside thickness (Ti) in the membrane thickness direction is within a specified range.

First, the control of the elongation is described. In the present invention, the elongation denotes the breaking elongation in the longitudinal direction of the membrane in a tensile strength test. A hollow fiber membrane cannot be used as is for blood treatment. Thus, about several thousand to several tens of thousands of the hollow fiber membranes are bundled, and the bundle is inserted into a cylindrical vessel. Thereafter, both ends thereof are sealed with resin to fabricate into a module (blood treating device). Typically, an aqueous solution is filled thereinto to form a wet type blood treating device, and the device is then sterilized. At this time, if mechanical properties of the hollow fiber membranes are low, a possibility of following damages becomes high: the workpiece gives in to the deformation in the module-fabricating step; or at time of the filling or the transportation of the device, the device gives in to the movement (sloshing) of the filled water. In a washing operation before the device is used in a therapy facility or in a washing step when the device is reused, the device may be affected by a high water flow or a high water pressure. Thus, whether the device is of a wet type or of a dry type, mechanical damages may be caused by the water. When the hollow fiber membranes in this state are used for dialysis treatment, it is feared that the blood leakage from the hollow fiber is induced to some extent.

It appears that to the mechanical damage of the hollow fiber membranes due to water are mainly concerned in the strength and the elongation among mechanical properties thereof. However, as a result of detailed investigations by the inventors, surprisingly, the mechanical damage could be restrained only by making the elongation high. The inventors have then ascertained that the fibril thicknesses of porous hollow fiber membranes particularly contribute to an improvement in the elongation, and found out that mechanical damage of hollow fiber membranes due to the water can be thoroughly restrained by setting the total average thickness (Tav) of the fibrils to 100 μm or more even when the membranes are a thin membrane of PSf having a thickness of not less than 25 μm and less than 40 μm. That is, even such a membrane can sufficiently keep 50% or more of an elongation. If the total average thickness (Tav) is made as small as less than 100 nm, a sufficient elongation tends not to be easily obtained. Thus, a tendency that the membrane undergoes mechanical damage by a large impact increases. The thickness is more preferably 110 nm or more. A mechanism therefor may be assumed as follows: the fibrils in a fibrous form are in the form of a smooth hand drum (tudumi), and this form is combined with a mixed composition composed of PSf, which is hydrophobic and hard, and PVP, which is hydrophilic and soft, so that the membrane stretches and shrinks locally, whereby the membrane absorbs deformation stress to be free from mechanical damage.

Although it is important for keeping the elongation that the fibrils are made thick, it has also been found out that there exists a limit in the relationship thereof with the albumin permeability. Specifically, it has been found out that as the total average thickness (Tav) is smaller, the leakage amount of albumin is smaller. The inventors have further made eager investigations to find out that when the total average thickness (Tav) of the fibrils is set to 200 nm or less, the leakage amount of albumin can be restrained to such a degree that malnutrition is not caused. The thickness (Tav) is more preferably 180 nm or less. Though the assumed mechanism therefor will be described later, for the above-mentioned reason, it is necessary to set the total average thickness (Tav) of the fibrils to 100 nm or more and 200 nm or less. When such fibrils constitute a porous structure, a membrane excellent in mechanical properties (in particular, elongation) is obtained while being thin membrane, and further the membrane gains an effect of restraining the leakage of albumin which is a part of fractionation property.

Moreover surprisingly, it has also been found out that in the fibrils, the distribution of the thicknesses in the membrane-thickness section, as well as the average thickness (Tav), is also concerned in the fractionation property. Specifically, as the ratio (To/Ti) of the average outside thickness (To) to the average inside thickness (Ti) in the membrane thickness direction is smaller, the fractionation property is improved. The fractionation property referred to in the invention denotes the ratio between the removal index (clearance) of $\beta_2$-microglobulin and the loss index (leakage amount) of albumin. About the fractionation property of blood dialysis membranes, a discussion is often made on the permeability ratio between $\beta_2$-microglobulin, which is to be removed from blood, and albumin, which is to remain in blood. However, in PSf hollow fibers, the performance of which has been becoming high, the property values indicating the performance have reached a ceiling; thus, a difference therebetween has not easily been found out. Moreover, the thin membrane of the invention also contributes to the diffusing performance inherent in the membrane in the removal of $\beta_2$-microglobulin (see, for example, "The High Performance Membrane for hemodialysis Staff", edited by the High Performance Membrane Workshop, Tokyo Igakusha (1990), p. 139). Accordingly, that the ratio between the clearance of $\beta_2$-microglobulin and the leakage amount of albumin is rendered an index for the fractionation property results in an extremely appropriate evaluation of a hollow fiber membrane excellent in fractionation property.

Results of eager investigations by the inventors demonstrate that in order to exhibit an excellent fractionation property for clinical treatment, it is necessary to arrange fibrils having a total average thickness in the above-mentioned range inside the membrane-thickness section so that the ratio of the outside to inside thickness (To/Ti) is 2 or less. When fibrils are each arranged in this manner to construct a porous structure of a thin membrane, an excellent fractionation property may be obtained. If the ratio of outside-to-inside thickness is more than 2, the index for the fractionation property referred to in the invention becomes as low as less than 100. The fractionation property is thus insufficient for blood treatment application. The ratio outside to inside thickness (To/Ti) is more preferably 1.8 or less, and is most preferably 1 from the viewpoint of the homogeneity. As long as a coagulable hollow-making inner solution and an outside coagulation bath are used to form a membrane in dry and wet spinning using an air gap in a production method, it is very difficult to set the ratio of outside-to-inside thickness (To/Ti) to less than 1 only by controlling the coagulable property.

The reason why the total average thickness (Tav) and the outside-to-inside thickness ratio (To/Ti) described above are concerned in the albumin permeability (leakage amount) and the fractionation property is unclear; however, the involvement may be thought to be based on the following principle:

First, it is well known that albumin has a negative charge. Therefore, when a large amount of albumin is adsorbed on the fibrils in the membrane-thickness section, the fibrils themselves are intensely charged into negative electricity to act on albumin which tries to permeate newly as a resistance based on charge repulsion. The small total average thickness (Tav) of the fibrils causes an increase in the surface area where albumin is adsorbed, which in turn causes an increase in the charge repulsion density. The structure means a structure capable of suppressing the albumin leakage effectively.

That the fibrils have a certain level of total average thickness (Tav) and a small ratio (To/Ti) of outside-to-inside thickness can keep the charge repulsion density of the whole membrane-thickness section high. As a result, the structure means a preferred structure in which the whole membrane-thickness section acts effectively for inhibiting the permeation of albumin. Reversely, that the outside-to-inside thickness ratio (To/Ti) is large means that the charge repulsion density is low in the outer layer region of the membrane. Thus, the effect of suppressing the albumin leakage cannot be expected. Furthermore, from the viewpoint of hydrodynamics, when the fibril thickness (T) is larger, that is, the total average thickness (Tav) and/or the average outside thickness (To) are/is large, whirls of the liquid permeating through the membrane grow so that the adsorption of albumin onto the fibrils is inhibited. As a result, an effective charge repulsion layer is not easily formed, which is disadvantageous for suppressing the albumin leakage. The above-mentioned effect is an effect peculiar to albumin, which is a charged protein. The effect does not work on low molecular weight proteins to be removed, including $\beta_2$-microglobulin, as a permeation inhibiting effect. Accordingly, a membrane structure in which the total average thickness (Tav) is small and the outside-to-inside thickness ratio (To/Ti) is small may be thought to exhibit an excellent fractionation property only by means of a sharp inhibition of albumin.

On the other hand, the permeation behavior of $\beta_2$-microglobulin would be as follows: that the fibrils have a certain level of average thickness (Tav) and a large ratio (To/Ti) of outside-to-inside thickness means that the average inside thickness (Ti) thereof is excessively small, that is, many small pores are present in the innermost layer region. In the case of small pores, the liquid flow remains easily so that low molecular weight proteins to be removed, such as $\beta_2$-microglobulin, also remain at a high concentration. In a high flux membrane as in the invention, it is said that diffusing effect acts also on low molecular weight proteins, such as $\beta_2$-microglobulin. However, in a microscopic structure corresponding to a case where the liquid-membrane resistance is extremely developed as described above, the diffusion and removal of $\beta_2$-microglobulin may be largely inhibited. In other words, it appears that the membrane having a large outside-to-inside thickness ratio (To/Ti) entirely becomes a permeation obstacle against low molecular weight proteins to act disadvantageously on the fractionation property.

Hitherto, an improvement in performances of a membrane has been mainly directed to an improvement in the permeability. As a result, an enlargement of a gradient structure has been looked toward. In the age when the technique of making pores in a membrane was immature and membranes in a range from low flux membranes to middle flux membranes were a mainstream, an excessive leakage of albumin was not caused. Thus, the design concept was never a mistake. However, nowadays, high flux membranes have been turned into a mainstream, and the albumin leakage has become a clinical problem; thus, a new design concept has been desired. The porous hollow fiber membrane for treating blood of the invention has been created by taking a main aim at the control of the fibril structure of a membrane-thickness section that has been considered not to give a large effect on the permeation property of proteins. The porous hollow fiber membrane of the invention suggests a new design concept in order to develop porous hollow fiber membranes for treating blood in the future.

The porous hollow fiber membrane for treating blood of the invention comprises PSf and PVP, and has a gradient porous structure in order to exhibit high mechanical properties while being a thin membrane, and needs to have the specified membrane thickness requirement and the specified fibril thickness and outside-to-inside thickness ratio. In order to make the membrane into a more preferred aspect, the following requirements may be further added thereto.

A first requirement is the water permeability of the hollow fiber membrane. When the hollow fiber membrane is used by being filled into a blood treating device, the water permeability of the hollow fiber membrane is set to the range of 5 to 450 mL/m$^2$/hr/mmHg in order to inhibit the permeation of endotoxin in a dialysate into the blood while at least removing water in blood. At such a level, $\beta_2$-microglobulin can be removed while the leakage amount of albumin is inhibited to a low value. In particular, in order to maximize the fractionation property while upgrading the $\beta_2$-microglobulin permeability, it is more preferred to set the water permeability of the hollow fiber membrane to the range of 120 to 450 mL/m$^2$/hr/mmHg.

A second requirement is the total average area density (ADav) of the fibrils, i.e. the number of fibrils per unit area of the membrane-thickness section. The total average area density (ADav) of the fibrils is a factor preferred for heightening the effect based on the total average thickness and the outside-to-inside thickness ratio of the fibrils. If the total average area density (ADav) is extremely low, a lack of the strength of the hollow fiber membrane emerges. Reversely, if the density is too high, the whole of the membrane unfavorably becomes dense. Extreme densification not only damages the advantages of the gradient porous structure, but also may not be kept the balance between the rigidity and the elongation by increasing the rigidity of the hollow fiber membrane. Accordingly, when the total average thickness is from 100 to 200 nm, the total average area density (ADav) of the fibrils is preferably in the range of 2 to 60 fibrils per square micrometer, more preferably 5 to 30 fibrils per square micrometer.

The total average area density (ADav) is measured in the same manner as the method of measuring the total average thickness (Tav) of the fibrils. Specifically, in the region measuring the total average thickness (Tav) in the structural photographs, the total number of the fibrils is counted instead of the thicknesses of 100 fibrils selected arbitrarily. The numbers in the each photograph are summed up. A value obtained by dividing this total number by the total area of the measurement area is the total average area density (ADav).

It is possible for an electron microscope to take a picture having a depth within the range of its focal depth. Thus, further fibrils may be observed in the back of some pores. Since the depth is about less than 1 μm under the present conditions, the depth region is regarded as the same plane with the measurement area. In the invention, the further fibrils observed in this manner are also counted. The structural photographs are each a cut transverse section of the hollow fiber membrane, thus, only fibrils extending into substantially two-dimensional directions on the cut transverse section are clearly observed while fibrils in the Z axis direction cannot be counted since the fibrils are in the rear of the visual field or are cut in the visual field aspect. However, it is sufficiently significant for the counting to count the two-dimensional direction fibrils out of the fibrils developing three-dimensionally since those fibrils are substantially at random.

The following will describe a method for producing the porous hollow fiber membrane for treating blood of the invention.

A membrane-forming raw spinning solution may be prepared by dissolving PSf and PVP into a common solvent. Examples of the common solvent include a solvent such as dimethylacetoamide (hereinafter referred to as DMAc), dimethylsulfoxide, N-methyl-2-pyrrolidone, dimethylformamide, sulfolane, dioxane or the like, and any solvent made of a mixed liquid of two or more of said solvents. The membrane-forming stock solution may be added with an additive such as water. However, water tends to impair the stability of the membrane-forming stock solution, thus, water is preferably not added if possible.

In the invention, an elongation higher than a certain level is required as described above. In connection with a property peculiar to PSf about this point, Bis-PSf tends to be better than PES. Thus, Bis-PSf is particularly preferred.

The stock solution contains a hydrophilizing agent to relieve the hydrophobicity of PSf to give blood compatibility to the membrane. As a hydrophilizing agent usable in a hollow fiber membrane for treating blood, known are PVP, polyethylene glycol, 2-methacryloyloxyethylphosphorylcholine (MPC), polyglycol monoester, starch and derivatives thereof, water-soluble cellulose derivatives such as carboxymethylcellulose cellulose acetate and the like, and any combination thereof. However, if a hydrophilizing agent low in affinity with PSf is used, microscopic defects should be underlying in the blood treatment device so that the elongation is unfavorably lowered as a result. If the hydrophilizing agent is low in hydrophilizing power, even though the affinity is high, the agent needs to be used in a large amount. Thus, a fall in the elongation is caused as well. For this reason, in order to obtain the hollow fiber membrane of the invention, it is essential to use a hydrophilizing agent which has both high affinity with PSf and high hydrophilizing ability. It is necessary to use PVP as a hydrophilizing agent having both advantages.

If the molecular weight of PVP used as the hydrophilizing agent is low, the fibrils constituting the hollow fiber membrane tend to become thin. As a result, the tensile strength of the hollow fiber membrane unfavorably becomes low. In the porous hollow fiber membrane of the invention, it is preferred to use PVP having high molecular weight in order to control the total average thickness of the fibrils to 100 nm or more and 200 nm or less. In general, it is preferred to use PVP of K80 to K90 grades, which has about 1000000 of weight-average molecular weight.

The PSf concentration in the membrane-forming stock solution is not particularly limited as long as a membrane can be formed and the formed membrane has a performance as a permeable membrane. The concentration is 5 to 35% by weight, preferably 10 to 30% by weight. In the case where a high water permeable performance may be attained, the polymer concentration (lower is better) is preferably 10 to 25% by weight. The PVP concentration is adjusted so that the mixing ratio of PVP to PSf is 27% by weight or less, preferably 18 to 27% by weight, more preferably 20 to 27% by weight. If the mixing ratio of PVP to PSf is more than 27% by weight, the elution amount tends to increase. If the ratio is less than 18% by weight, the PVP concentration in the inner surface of the membrane lowers so that a leucopenia symptom in which the concentration of leucocyte in blood of a patient is rapidly decreased is unfavorably observed.

Next, the membrane-forming stock solution and a hollow-making inner solution which coagulates the stock solution are simultaneously discharged into the air using a tube-in-orifice spinneret from the orifice of the spinneret. The hollow-making inner solution may be water, or a coagulating liquid made mainly of water. Generally, the liquid is preferably a mixed solution composed of the same solvent as used in the membrane-forming stock solution, and water, for example, a 20-60% by weight DMAc aqueous solution and the like may be used. At this time, by adjusting the discharge amount of the stock solution and the discharge amount of the hollow-making inner solution, the inside diameter and the membrane thickness of the hollow fiber membrane can be adjusted to desired values. The inside diameter of the hollow fiber membrane may be 170 to 250 μm in a blood treatment application, preferably 180 to 200 μm. If the membrane thickness is too large, the mass transfer resistance is large as a permeable membrane, and thus the efficiency of the diffusion and removal of low molecular weight materials decrease. It is therefore necessary that the membrane thickness of the hollow fiber membrane of the invention be less than 40 μm.

The membrane-forming stock solution discharged from the spinneret together with the hollow-making inner solution runs through air gap region, is introduced into a coagulation bath containing water as a main component installed below the spinneret, and immersed in the coagulation bath for a certain period of time to complete coagulation. The process is the so-called dry and wet spinning. The air gap region means a space between the spinneret and the coagulation bath. The membrane-forming stock solution is started to coagulate from the inner surface side with a poor solvent component in the hollow-making inner solution discharged simultaneously from the spinneret. While the stock solution runs through the air gap region, the coagulation progresses toward the outside. The poor solvent supplied from the hollow-making inner solution permeates through the membrane-forming stock solution mainly by effect of diffusion, and the structure of the hollow fiber membrane is formed. Toward the outside, the concentration of the poor solvent becomes lower. Accordingly, the coagulation in the outer surface side progresses more slowly than in the inner surface side. If the running time in the air gap region is long, the slow coagulation in the outer surface side progresses, and the fibril structures grow thick. Reversely, if the running time through the air gap region is short, the stock solution is immersed in the coagulation bath in the state that the poor solvent supplied from the hollow-making inner solution does not diffuse sufficiently to the outer surface side. The outer surface side that is not yet coagulated is abruptly coagulated with the coagulation bath liquid made mainly of water which is a poor solvent, so that the formation of pores is inhibited. As a result, the fibril structures in the outer surface side also turn thick.

In the invention, it is particularly important to arrange fibrils so that the ratio (To/Ti) of the average outside thickness (To) to the average inside thickness (Ti) is 2 or less in the membrane-thickness section. In order to realize said membrane structure, it has been found out that it is preferred to control the air gap length, the spinning rate and the hollow fiber membrane thickness in accordance with a relational expression represented by the following inequality (3):

$$-0.18 \leq H/V - M/46.6 \leq 0.18 \quad (3)$$

wherein H is the air gap length (m), V is the spinning rate (m/second), and M is the hollow fiber membrane thickness (μm).

H/V represents the running time through the air gap region, and 46.6 means the permeation rate of the hollow-making inner solution. "H/V−M/46.6" means the coagulation balance of the membrane-forming stock solution in the air gaps region, and is a relational expression for arranging the fibrils as descried above. Examples of a case where the value of "H/V−M/46.6" is larger than 0.18 in the inequality (3) include a case where the spinning rate is slow so that the running time through the air gap is long, and the coagulation advances slow, whereby the fibril structures become thick, and a case where the membrane thickness is small, and the permeation of the hollow-making inner solution is relatively fast, whereby the fibril structures become thick. On the other hand, examples of a case where the value of "H/V−M/46.6" is smaller than −0.18 include a case where the air gap length is short, the running time through the air gap is thus short, and the stock solution is momentarily immersed in the coagulation bath, whereby the fibril structures in the outer surface side become thick, and a case where the membrane thickness is large, the stock solution is thus immersed into the coagulation bath in the state that the poor solvent supplied from the hollow-making inner solution does not diffuse sufficiently to the outer surface side, whereby the fibril structures become thick.

The number of the fibrils shows a negative correlation with the fibril thickness as long as the kind of the membrane-forming stock solution and the discharge amount thereof are constant. As the fibril structures are thicker, the number thereof tends to be smaller.

After the end of the immersion of the hollow fiber membrane in the coagulation bath, the membrane is then washed with hot water or the like to remove the solvent remaining on the hollow fiber membrane. Thereafter, the hollow fiber membrane is successively introduced into a dryer to be dried with hot wind or the like, whereby a dried hollow fiber membrane can be obtained. In a case where the hollow fiber membrane is continuously dried without being cut, naturally, the drying advances from the outer surface of the hollow fiber membrane. Thus, the outer surface side undergoes a more intense thermal hysteresis than the inner surface side. Utilizing this principle, it is possible to specifically shrink only the fibrils in the outside region in the membrane thickness direction to adjust the thicknesses to the extent of smaller values. At this time, the temperature of the hot air used for the drying is preferably 150 to 180° C. However, at such a high temperature, it is necessary to prevent the fibrils in the whole of the hollow fiber membrane from being shrunk or softened. Thus, high-speed drying in a short time becomes necessary. When the drying is ended preferably within 60 seconds, the thicknesses of the fibrils in the outer surface side can be adjusted by shrinkage. At the time, it is effective from the viewpoint of drying efficiency to flow the hot air countercurrently to the moving direction of the hollow fiber membrane. However, in order to control a microscopic fibril structure as in the invention, it is preferred alternately to flow countercurrently and to flow co-currently to relieve a rapid shrinkage. The thickness of the fibrils is controlled not only by the spinning-out section but also by the use of such a drying method in combination with the section. In this way, both of the total average thickness and the outside-to-inside thickness ratio can be controlled.

Porous hollow fiber membranes for treating blood, as obtained through the above-mentioned steps are supplied, in the form of a bundle adjusted the length and the number of the membranes so as to give a desired membrane area, to a module fabricating step. In this step, the bundle is filled into a cylindrical vessel having two nozzles (inlet and outlet nozzles for a dialysate) near both ends of a side face thereof, respectively. Both of the ends are embedded with urethane resin. When these operations are made by hand or by means of a machine, large tension, bending and compressing effects act on the hollow fiber membranes, in particular, the hollow fiber membranes are mechanically damaged with ease near the outer circumference of the bundle. In order to absorb the mechanical deformations and relieve the stress, the hollow fiber membranes need to have an elongation more than a certain level. As described above, the porous hollow fiber membranes of the invention have a sufficient elongation certainly by selecting the raw material(s) thereof and optimizing the membrane structure (the fibril thicknesses and the distribution).

Next, the cured urethane regions are cut to be worked into ends wherein the hollow fiber membranes are open. Header caps each having nozzles (blood side nozzles) for liquid introduction (discharge) are fitted to both the ends to be fabricated into the form of a blood treating device. Next, the workpiece is subjected to sterilization with radial rays, an electron beam or the like to complete a blood treating device.

EXAMPLES

The invention will be specifically described by way of the following examples, however, the invention is not limited to the examples. First, methods for evaluating a hollow fiber membrane or a blood treating device are described.

[Elongation of Hollow Fiber Membrane]

A chuck is used to fix any A dried hollow fiber membrane with 20 cm of length is fixed using chucks onto a measurement region of a tensile test machine (EZ Test series, manufactured by Shimadzu Corp.) in a room conditioning a temperature of 20 to 25° C. and a relative humidity of 55 to 60%. The membrane is pulled at a rate of 30 cm/minute. The elongation length when the membrane is broken is divided by 20 cm, which is the length of the hollow fiber membrane before the measurement, and then multiplied by 100. The resultant value is defined as the elongation (%).

[Impact Resistance of Hollow Fiber Membrane (Leakage Test)]

As a test made on the supposition of the sloshing in the blood treating device during transportation thereof, a drop test is made on a blood treating device in which hard caps made of polypropylene are fitted into all nozzles. In the state that the blood side thereof is sealed with the caps, water is filled into the hollow-outside region (non-blood-side). The non-blood-side is again sealed with caps, and then in the state that both the headers are located along the vertical direction, the device is dropped from a height of 75 cm to apply an impact thereto. After the dropping, a leakage test is made on the hollow fiber membranes. Until a leakage is generated or the total number of the test operations reaches 10, the dropping and the leakage test are repeated. Under the conditions, the inside of the hollows is not filled with water, which may function as a cushion. As a result, the membranes are more easily damaged by sloshing of the water when the device is dropped. Thus, the test corresponds to a severer test made on the supposition that heavy sloshing is caused.

As to the leakage test on the hollow fiber membranes, water is filled into the blood treating device. In the state that the device is fixed so as to direct two nozzles of the cylindrical vessels upward, the nozzles are opened. Furthermore, from the nozzle of one of the headers, pressure is applied to the inside by compressed air having a pressure of 0.15 MPa (at this time, the other header nozzle is closed). The device is observed for 30 seconds. The state that air does not leak into the vessel within the period is judged as no leakage. The state that air leaks is judged as leakage (NG).

[Water Permeability of Hollow Fiber Membranes]

Hollow fiber membranes are sampled, and a mini-module having an effective length of 18 cm is manufactured therefrom. The hollow fiber membranes may be in a wet state or in a dry state. The manufactured mini-module is immersed into pure water, the temperature of which is adjusted to 37±0.5° C., for 1 hour before the water permeability is measured. While the pure water, the temperature of which has been adjusted to 37±0.5° C., is caused to pass through the module, the amount of water that permeates through the hollow fiber membranes at a transmembrane pressure difference of 200 mmHg is measured.

[Permeable Performance of Blood Treating Device in Bovine Plasma]

In a clearance measurement using bovine plasma, in accordance with a method for evaluating performances of a blood treating device, the method being prescribed in the Japanese Society for Dialysis Therapy (Takeshi Sato et al., the Journal of the Japanese Society for Dialysis Therapy, 1996, vol. 26, pp. 1231-1245, and Yoshito Kawaguchi et al., the Journal of the Japanese Society for Dialysis Therapy, 1999, vol. 32, pp. 1465-1469), the clearance of urea and that of $\beta_2$-microglobulin are measured under the following conditions: inlet flow rate at the blood side: QBin=200 mL/minute, inlet flow rate at the dialysate side: QDin=500 mL/minute, and filtrate flow rate QF=10 mL/minute/m².

About the leakage amount of albumin, 2 L of bovine plasma having a total protein concentration of 6.5±0.5 g/dL in the blood side and 5 L of a dialysate in the dialysate side both are circulated under the conditions of QBin=200 mL/minute, QDin=500 mL/minute, and QF=0 mL/minute. After the circulation for one hour, the dialysate is collected. The albumin concentration in the dialysate is analyzed in accordance with the CBB method (Coomassie Plus Protein Assay Reagent, manufactured by PIERCE Co.). The amount of albumin leaked into the dialysate during the one hour circulation is defined as the albumin leakage amount.

Example 1

Prepared was a membrane-forming stock solution composed of 17 parts by weight of Bis-PSf (P-1700, manufactured by Solvay Co.), 4 parts by weight of PVP (K-90, manufactured by ISP, Inc.), and 79 parts by weight of DMAc (special grade reagent, manufactured by Kishida Chemical Co., Ltd.). As a hollow-making inner solution, a 60% by weight DMAc solution in water was used, and the solution was discharged from a spinneret having a slit width of 50 μm. In this case, the temperature of the membrane-forming stock solution was 40° C. at the time of the discharge. The discharged stock solution was passed through a falling section covered with a hood and then immersed into a coagulation bath made of water, 60° C. in temperature, to be coagulated. At this time, the air gap length and the spinning rate were 400 mm and 30 m/minute, respectively. The resultant was washed with water, and dried to obtain blood treating membranes. The drying temperature and the drying time were 160° C. and 100 seconds, respectively. The discharge amounts of the membrane-forming stock solution and the hollow-making inner solution were adjusted so as to obtain the dried membrane having a thickness of 35 μm and an inside diameter of 185 μm (the membrane thickness and the inside diameter were adjusted in the same way in each of Examples and Comparative Examples described below). Under the spinning conditions, the value of "H/V–T/4" was 0.05. From the resultant hollow fiber membranes, a blood treating device (artificial kidney) having an effective membrane area of 1.5 m² was fabricated.

In the resultant hollow fiber membranes, the membrane thickness, the Tav, the Ti, the To, the ratio of Ti/To, the ADav, the elongation, the urea clearance (Urea CL), the $\beta_2$-microglobulin clearance ($\beta$2MG CL), the amount of albumin leakage (Alb leakage amount), and the water permeability are shown in Table 1, together with those of Examples and Comparative Examples described below. The impact resistance test was made 10 times in total; however, no leakage was observed.

Example 2

The same method as in Example 1 was carried out, except that a 50% by weight DMAc solution in water was used as the hollow-making inner solution. Under the spinning conditions, the value of "H/V−T/4" was 0.06. The impact resistance test was made 10 times in total; however, no leakage was observed.

Example 3

The same method as in Example 1 was carried out, except that a 20% by weight DMAc solution in water was used as the hollow-making inner solution, and the discharge amounts of the membrane-forming stock solution and the hollow-making inner solution were adjusted so as to obtain the dried membrane having a thickness of 40 μm and an inside diameter of 185 μm. Under the spinning conditions, the value of "H/V−T/4" was −0.05. The impact resistance test was made 10 times in total; however, no leakage was observed.

Example 4

The same method as in Example 1 was carried out, except that a 50% by weight DMAc solution in water was used as the hollow-making inner solution, and the air gap length and the spinning rate were 200 mm and 21 m/minute, respectively. Under the spinning conditions, the value of "H/V−T/4" was −0.17.

Example 5

The same method was carried out in the same way as in Example 1 except that a 50% by weight DMAc solution in water was used as the hollow-making inner solution, and the air gap length and the spinning rate were 600 mm and 39 m/minute, respectively. Under the spinning conditions, the value of "H/V−T/4" was 0.17.

Example 6

The same method as in Example 1 was carried out, except that a 50% by weight DMAc solution in water was used as the hollow-making inner solution, the air gap length and the spinning rate were 200 mm and 25 m/minute, respectively, and the discharge amounts of the membrane-forming stock solution and the hollow-making inner solution were adjusted to obtain the dried membrane having a thickness of 25 μm and an inside diameter of 185 μm. Under the spinning conditions, the value of "H/V−T/4" was −0.05.

Example 7

Prepared was a membrane-forming stock solution composed of 17 parts by weight of PES (SUMIKA EXCEL 4800P, manufactured by Sumitomo Chemical Co., Ltd.), 4 parts by weight of PVP (K-90, manufactured by ISP Inc.), and 79 parts by weight of DMAc (special grade reagent, manufactured by Kishida Chemical Co., Ltd.). As a hollow-making inner solution, a 30% by weight DMAc solution in water was used, and the solution was discharged from a spinneret having a slit width of 50 μm.

In this case, the temperature of the membrane-forming stock solution was 40° C. at the time of the discharge. The discharged stock solution was passed through a falling section covered with a hood and then immersed into a coagulation bath made of water, 60° C. in temperature, to be coagulated. At this time, the air gap length and the spinning rate were 400 mm and 30 m/minute, respectively. The resultant was washed with water, and dried to obtain blood treating membranes. The drying temperature and the drying period were 160° C. and 100 seconds, respectively. The discharge amounts of the membrane-forming stock solution and the hollow-making inner solution were adjusted so as to obtain the thickness and the inside diameter of the dried membrane to 35 μm and 185 μm, respectively. Under the spinning conditions, the value of "H/V−T/4" was 0.04. From the resultant hollow fiber membranes, a blood treating device (artificial kidney) having an effective membrane area of 1.5 m² was fabricated.

Comparative Example 1

The same method as in Example 1 was carried out, except that a 50% by weight DMAc solution in water was used as the hollow-making inner solution, and the spinning rate was 25 m/minute. Under the spinning conditions, the value of "H/V−T/4" was 0.20.

Comparative Example 2

The same method as in Example 1 was carried out, except that a 50% by weight DMAc solution in water was used as the hollow-making inner solution, and the spinning rate was 45 m/minute. Under the spinning conditions, the value of "H/V−T/4" was −0.21.

Comparative Example 3

The same method as in Example 1 was carried, except that a 50% by weight DMAc solution in water was used as the hollow-making inner solution, and the drying temperature was 120° C. Under the spinning conditions, the value of "H/V−T/4" was 0.05.

Comparative Example 4

The same method as in Example 1 was carried out, except that a 50% by weight DMAc solution in water was used as the hollow-making inner solution, and the drying period was 250 seconds. Under the spinning conditions, the value of "H/V−T/4" was 0.04.

Comparative Example 5

The same method as in Example 1 was carried out, except that a 50% by weight DMAc solution in water was used as the hollow-making inner solution, and the drying temperature was 190° C. Under the spinning conditions, the value of "H/V−T/4" was 0.06.

Comparative Example 6

The same method as in Example 1 was carried out, except that a 50% by weight DMAc solution in water was used as the hollow-making inner solution, and the discharge amounts of the membrane-forming stock solution and the hollow-making inner solution were adjusted to obtain the membrane having the thickness of 45 μm and the inside diameter of the dried membrane of 185 μm. Under the spinning conditions, the value of "H/V−T/4" was −0.16.

Comparative Example 7

Prepared was a membrane-forming stock solution composed of 17 parts by weight of PES (SUMIKA EXCEL 4800P, manufactured by Sumitomo Chemical Co., Ltd.), 4 parts by weight of PVP (K-90, manufactured by ISP Inc.), and 79 parts by weight of DMAc (special grade reagent, manufactured by Kishida Chemical Co., Ltd.). As a hollow-making inner solution, a 30% by weight DMAc solution in water was used, and the solution was discharged from a spinneret having a slit width of 50 μm. In this case, the temperature of the membrane-forming stock solution was 40° C. at the time of the discharge. The discharged stock solution was passed through a falling section covered with a hood and then immersed into a coagulation bath made of water, 60° C. in temperature, to be coagulated. At this time, the air gap length and the spinning rate were 200 mm and 30 m/minute, respectively. The resultant was washed with water, and dried to obtain blood treating membranes. The drying temperature and the drying period were 160° C. and 100 seconds, respectively. The discharge amounts of the membrane-forming stock solution and the hollow-making inner solution were adjusted so as to obtain the membrane having the thickness of 35 μm and the inside diameter of 185 μm, respectively. Under the spinning conditions, the value of "H/V−T/4" was −0.35. From the resultant hollow fiber membranes, a blood treating device (artificial kidney) having an effective membrane area of 1.5 m² was fabricated.

Comparative Example 8

Prepared was a membrane-forming stock solution composed of 17 parts by weight of PES (SUMIKA EXCEL 4800P, manufactured by Sumitomo Chemical Co., Ltd.), 0.8 parts by weight of PVP (K-90, manufactured by ISP Inc.), 3.2 parts by weight of PVP (K-30, manufactured by ISP Inc.) and 79 parts by weight of DMAc (special grade reagent, manufactured by Kishida Chemical Co., Ltd.). As a hollow-making inner solution, a 30% by weight DMAc solution in water was used, and the solution was discharged from a spinneret having a slit width of 50 μm. In this case, the temperature of the membrane-forming stock solution was 40° C. at the time of the discharge. The discharged stock solution was passed through a falling section covered with a hood and then immersed into a coagulation bath made of water, 60° C. in temperature, to be coagulated. At this time, the air gap length and the spinning rate were 200 mm and 30 m/minute, respectively. The resultant was washed with water, and dried to obtain blood treating membranes. The drying temperature and the drying period were 160° C. and 100 seconds, respectively. The discharge amounts of the membrane-forming stock solution and the hollow-making inner solution were adjusted so as to obtain the thickness and the inside diameter of the dried membrane to 30 μm and 185 μm, respectively. Under the spinning conditions, the value of "H/V−T/4" was −0.25. From the resultant hollow fiber membranes, a blood treating device (artificial kidney) having an effective membrane area of 1.5 m² was fabricated.

As shown in Tables 1 and 2, the hollow fiber membrane in which fibrils having a total average thickness (Tav) of 100 to 200 are arranged so that the ratio (To/Ti) of the average outside thickness (To) of the fibrils to the average inside thickness (Ti) thereof in the membrane thickness direction is 2 or less have a high elongation of 50% or more even when the membrane is thin membrane having a membrane thickness of less than 40 μm. Also, in the leakage test made on the supposition of severe conditions, high impact resistance is exhibited. In particular, in the case using Bis-PSf, the tendency is remarkable. Effects in mechanical properties peculiar to the individual polymers are recognized even in the case using same PSf. Moreover, the membrane exhibits a high fractionation property, the index value of which is considerably larger than 100.

In Table 2 are shown examples wherein the outside-to-inside thickness ratio (To/Ti) of the fibrils is slightly smaller than 1, and there are examples that the homogeneity appears to be high (Comparative Examples 4 and 5). However, this result is due to excessive drying shrinkage. Probably from an effect of the thermal hysteresis thereof, an inconvenience is caused about both of the elongation and the fractionation property.

TABLE 1

|  |  | Example | | | | | | |
| --- | --- | --- | --- | --- | --- | --- | --- | --- |
|  |  | 1 | 2 | 3 | 4 | 5 | 6 | 7 |
| Concentration of hollow-making inner solution | [%] | 60 | 50 | 20 | 50 | 50 | 50 | 30 |
| Air gap length | [mm] | 400 | 400 | 400 | 200 | 600 | 200 | 400 |
| Spinning rate | [mm/min] | 30 | 30 | 30 | 21 | 39 | 25 | 30 |
| Membrane thickness | [μm] | 35.1 | 34.7 | 39.8 | 34.6 | 35.0 | 24.9 | 35.5 |
| H/V-M/46.6 | [sec] | 0.05 | 0.06 | −0.05 | −0.17 | 0.17 | −0.05 | 0.04 |
| Drying temperature | [° C.] | 160 | 160 | 160 | 160 | 160 | 160 | 160 |
| Drying time | [sec] | 100 | 100 | 100 | 100 | 100 | 100 | 100 |
| Tav | [nm] | 168 | 149 | 116 | 153 | 140 | 144 | 151 |
| Ti | [nm] | 131 | 118 | 80 | 120 | 113 | 117 | 103 |
| To | [nm] | 212 | 186 | 149 | 229 | 224 | 220 | 178 |
| To/Ti | [—] | 1.62 | 1.58 | 1.86 | 1.91 | 1.98 | 1.88 | 1.73 |
| ADav | [filament/μm²] | 9.2 | 15.9 | 15.4 | 23.5 | 13.0 | 16.2 | 30.7 |
| Water permeability | [mL/m² · hr · mmHg] | 396.1 | 135.0 | 6.3 | 133.9 | 130.5 | 142.7 | 151.3 |
| Urea CL | [mL/min] | 199.2 | 198.5 | 196.8 | 198.4 | 197.9 | 198.1 | 198.6 |
| $\beta_2$-MG CL(a) | [mL/min] | 79.3 | 46.0 | 1.1 | 47.3 | 44.1 | 49.5 | 48.2 |
| Alb leakage amount (b) | [g] | 0.6 | 0.1 | <0.1 | <0.1 | <0.1 | <0.1 | <0.1 |

TABLE 1-continued

| | | Example | | | | | | |
|---|---|---|---|---|---|---|---|---|
| | | 1 | 2 | 3 | 4 | 5 | 6 | 7 |
| Fractionation property (a/b) | [—] | 132 | 460 | 1.1< | 473< | 441< | 495< | 482< |
| Elongation | [%] | 78.3 | 76.5 | 99.2 | 76.1 | 74.5 | 72.9 | 54.6 |
| Leakage generation | [number of dropping] | 10< | 10< | 10< | 10< | 10< | 10< | 7 |

TABLE 2

| | | Comparative example | | | | | | | |
|---|---|---|---|---|---|---|---|---|---|
| | | 1 | 2 | 3 | 4 | 5 | 6 | 7 | 8 |
| Concentration of hollow-making inner solution | [%] | 50 | 50 | 50 | 50 | 50 | 50 | 30 | 30 |
| Air gap length | [mm] | 400 | 400 | 400 | 400 | 400 | 400 | 200 | 200 |
| Spinning rate | [mm/min] | 25 | 45 | 30 | 30 | 30 | 30 | 30 | 30 |
| Membrane thickness | [μm] | 35.6 | 34.8 | 35.1 | 35.3 | 34.5 | 44.8 | 34.9 | 30.1 |
| H/V-M/46.6 | [sec] | 0.20 | −0.21 | 0.05 | 0.04 | 0.06 | −0.16 | −0.35 | −0.25 |
| Drying temperature | [° C.] | 160 | 160 | 120 | 160 | 190 | 160 | 160 | 160 |
| Drying time | [sec] | 100 | 100 | 100 | 250 | 100 | 100 | 100 | 100 |
| Tav | [nm] | 163 | 155 | 214 | 125 | 118 | 224 | 110 | 84 |
| Ti | [nm] | 84 | 152 | 113 | 129 | 118 | 146 | 83 | 46 |
| To | [nm] | 218 | 351 | 388 | 124 | 114 | 306 | 327 | 87 |
| To/Ti | [—] | 2.61 | 2.31 | 3.43 | 0.96 | 0.97 | 2.10 | 3.94 | 1.89 |
| ADav | [filament/μm$^2$] | 17.4 | 18.7 | 16.3 | 15.1 | 15.6 | 2.7 | 38.3 | 50.5 |
| Water permeability | [mL/m$^2$ · hr · mmHg] | 133.2 | 130.8 | 134.7 | 130.1 | 129.8 | 133.4 | 149.2 | 168.3 |
| Urea CL | [mL/min] | 198.3 | 198.3 | 198.5 | 198.1 | 198.0 | 197.3 | 198.0 | 198.7 |
| β$_2$-MG CL(a) | [mL/min] | 48.0 | 46.7 | 49.8 | 50.3 | 52.4 | 49.2 | 47.5 | 49.9 |
| Alb leakage amount (b) | [g] | 0.6 | 0.8 | 0.9 | 1.0 | 1.2 | 0.5 | 0.8 | 1.1 |
| Fractionation property (a/b) | [—] | 80 | 58 | 55 | 50 | 44 | 98 | 59 | 45 |
| Elongation | [%] | 79.1 | 76.6 | 81.8 | 74.0 | 71.5 | 80.2 | 39.2 | 40.3 |
| Leakage generation | [number of dropping test] | 10< | 10< | 10< | 8 | 7 | 10< | 3 | 4 |

INDUSTRIAL APPLICABILITY

The porous hollow fiber membrane for treating blood of the invention is low in risk that the membrane is mechanically damaged and is excellent in the fractionation property between uremic toxins and useful proteins when the membrane is used in dialysis treatment. Thus, the membrane can be used safely and effectively in extracorporeal circulation treatments, such as blood dialysis and the like.

The invention claimed is:

1. A porous hollow fiber membrane for treating blood, comprising a polysulfone-based polymer and polyvinylpyrrolidone, and having a gradient porous structure in which a pore size of pores increases from an inside of the membrane toward an outside thereof in a membrane thickness direction, wherein a membrane thickness section of the porous structure has a membrane thickness of not less than 25 μm and less than 40 μm, and fibrils having a total-average thickness of 100 to 200 nm are arranged so that a ratio (To/Ti) of an average outside thickness (To) of the fibrils in a first intermediate region that is proximate an outer side of the membrane to an average inside thickness (Ti) of the fibrils in a second intermediate region that is proximate the inner side of the membrane, in the membrane thickness direction, is not less than 1 and not more than 2, the first intermediate region being spaced inwardly from the outer side of the membrane so as to be positioned within a central region of an outer portion of the membrane thickness section, the outer portion of the membrane thickness section being defined by a 15 μm width extending inwardly from the outer side of the membrane, the second intermediate region being spaced outwardly from the inner side of the membrane so as to be positioned within a central region of an inner portion of the membrane thickness section, the inner portion of the membrane thickness section being defined by a 15 μm width extending outwardly from the inner side of the membrane, wherein the membrane thickness direction, the membrane thickness section, the first intermediate region and the second intermediate region are each defined by a section taken perpendicular to a longitudinal direction of the porous hollow fiber membrane.

2. The porous hollow fiber membrane for treating blood according to claim 1, wherein a total-average area density (ADav) of the fibrils is 2 to 60 fibrils per square micrometer in a membrane-thickness section taken perpendicular to the longitudinal direction of the porous hollow fiber membrane.

3. The porous hollow fiber membrane for treating blood according to claim 1, further having a water permeability of 5 to 450 mL/m$^2$/hr/mmHg.

4. The porous hollow fiber membrane for treating blood according to claim 1, wherein the polysulfone-based polymer is a bisphenol type polysulfone.

5. A blood treating device obtained by filling the porous hollow fiber membranes of claim 1 into a cylindrical vessel, embedding both ends thereof with a resin, working the both ends into open hollow-fiber-membrane-ends, and then setting a header cap having a liquid-introducing or liquid-discharging nozzle to the both ends.

6. The porous hollow fiber membrane for treating blood according to claim 2, further having a water permeability of 5 to 450 mL/m$^2$/hr/mmHg.

7. The porous hollow fiber membrane for treating blood according to claim 2, wherein the polysulfone-based polymer is a bisphenol type polysulfone.

8. The porous hollow fiber membrane for treating blood according to claim 3, wherein the polysulfone-based polymer is a bisphenol type polysulfone.

9. The porous hollow fiber membrane for treating blood according to claim 6, wherein the polysulfone-based polymer is a bisphenol type polysulfone.

10. A blood treating device obtained by filling the porous hollow fiber membranes of claim 2 into a cylindrical vessel, embedding both ends thereof with a resin, working the both ends into open hollow-fiber-membrane-ends, and then setting a header cap having a liquid-introducing or liquid-discharging nozzle to the both ends.

11. A blood treating device obtained by filling the porous hollow fiber membranes of claim 3 into a cylindrical vessel, embedding both ends thereof with a resin, working the both ends into open hollow-fiber-membrane-ends, and then setting a header cap having a liquid-introducing or liquid-discharging nozzle to the both ends.

12. A blood treating device obtained by filling the porous hollow fiber membranes of claim 4 into a cylindrical vessel, embedding both ends thereof with a resin, working the both ends into open hollow-fiber-membrane-ends, and then setting a header cap having a liquid-introducing or liquid-discharging nozzle to the both ends.

13. A blood treating device obtained by filling the porous hollow fiber membranes of claim 6 into a cylindrical vessel, embedding both ends thereof with a resin, working the both ends into open hollow-fiber-membrane-ends, and then setting a header cap having a liquid-introducing or liquid-discharging nozzle to the both ends.

14. A blood treating device obtained by filling the porous hollow fiber membranes of claim 7 into a cylindrical vessel, embedding both ends thereof with a resin, working the both ends into open hollow-fiber-membrane-ends, and then setting a header cap having a liquid-introducing or liquid-discharging nozzle to the both ends.

15. A blood treating device obtained by filling the porous hollow fiber membranes of claim 8 into a cylindrical vessel, embedding both ends thereof with a resin, working the both ends into open hollow-fiber-membrane-ends, and then setting a header cap having a liquid-introducing or liquid-discharging nozzle to the both ends.

16. A blood treating device obtained by filling the porous hollow fiber membranes of claim 9 into a cylindrical vessel, embedding both ends thereof with a resin, working the both ends into open hollow-fiber-membrane-ends, and then setting a header cap having a liquid-introducing or liquid-discharging nozzle to the both ends.

17. The porous hollow fiber membrane for treating blood according to claim 1, wherein the ratio (To/Ti) of the average outside thickness (To) of the fibrils to the average inside thickness (Ti) thereof in the membrane thickness direction is more than 1.

18. The porous hollow fiber membrane for treating blood according to claim 17, wherein the ratio (To/Ti) of the average outside thickness (To) of the fibrils to the average inside thickness (Ti) thereof in the membrane thickness direction is between 1.62 to 1.73.

19. The porous hollow fiber membrane for treating blood according to claim 1, wherein the first intermediate region is further defined by a 5 μm width band region in the central region of the outer portion of the membrane thickness section and the second intermediate region is further defined by a 5 μm width band region in the central region of the inner portion of the membrane thickness section.

* * * * *